E. P. WILLIAMS.
INTERNAL COMBUSTION MOTOR.
APPLICATION FILED JULY 7, 1910.

1,037,094.

Patented Aug. 27, 1912.
5 SHEETS—SHEET 1.

Witnesses:

Inventor:
E. P. Williams

E. P. WILLIAMS.
INTERNAL COMBUSTION MOTOR.
APPLICATION FILED JULY 7, 1910.

1,037,094.

Patented Aug. 27, 1912.

Witnesses:

Inventor
E. P. Williams
by
Attys

UNITED STATES PATENT OFFICE.

EDWARD P. WILLIAMS, OF GLOUCESTER, MASSACHUSETTS.

INTERNAL-COMBUSTION MOTOR.

1,037,094.

Specification of Letters Patent. Patented Aug. 27, 1912.

Application filed July 7, 1910. Serial No. 570,748.

*To all whom it may concern:*

Be it known that I, EDWARD P. WILLIAMS, of Gloucester, in the county of Essex and State of Massachusetts, have invented certain new and useful Improvements in Internal-Combustion Motors, of which the following is a specification.

This invention relates to an internal combustion engine, preferably one using liquid hydrocarbon as fuel, and has for its object to enable rotary motion to be imparted to a shaft in a series of impulses by a construction having less complication, a fewer number of parts, and consequently greater simplicity than is possible with reciprocating engines of the ordinary types capable of producing the same number of impulses in each revolution.

Another object is to provide an engine having rotarily moving working parts and constructed so that the moving parts produce the necessary compression of the explosive charge in the combustion chamber before firing thereof, thus doing away with the auxiliary air compressor or pump which has hitherto been found necessary in rotary gas engines.

In carrying my invention into effect I have embodied the same in a semi-rotary engine having relatively oscillative and fixed pistons and abutments between which the charges of the explosive mixture are compressed and ignited. In connection with these parts I have provided a motion-transmitting mechanism capable of converting the back and forth movements of the oscillating parts into continuous rotation of a shaft and other driven members. This construction lends itself readily to the making of a duplex engine in a single casing, without additional complication or a much greater number of parts or much greater weight, whereby two impulses of equal force may be transmitted to the rotating shaft at each rotation thereof, thereby enabling the same turning effect to be applied to the shaft as is applied by a two-cycle engine having two cylinders, or a four-cycle engine of four cylinders, and of much greater simplicity, fewer parts and less weight.

In the accompanying drawings, I have shown for the purpose of illustrating the fundamental principles of my invention, the preferred embodiment of such principles in a working engine with modifications in some of the details of construction, it being understood, however, that I do not limit myself to the precise form and arrangement of the engine or the details of construction here shown.

In the drawings, Fig. 9 is a perspective view showing one of the packing members and the spring for pressing it against the surface whereon it is adapted to bear.

Referring to the drawings, and first to Figs. 1, 2, 3 and 4, the engine is shown as consisting of an outer cylindrical casing 1, having a base 2, whereon it is supported, and end walls or heads 3, within which is contained a semi-rotary or vibrating member 4 which, for the purpose of description and of avoiding cumbersome terminology, I will call the vibrator. This vibrator consists of a cylindrical body mounted concentrically within the cylindrical walls of the casing, and approximately radial pistons 5 and 6. Projecting inwardly from the walls of the casing are abutments 7 and 8, which extend to the surface of the cylindrical part of the vibrator and are packed so as to make as nearly as possible gas-tight joints therewith. The pistons 5 and 6 similarly extend outwardly into engagement with the walls of the casing and are also packed. The number of pistons and abutments shown in this embodiment of the invention is two each, but I desire it to be distinctly understood that I do not limit myself to any particular number, but may employ only a single piston and abutment, or a greater number than two of each, according to the requirements of the service to which the engine is designed. The pistons and abutments divide the annular space between the casing and vibrator into two combustion chambers 9 and 10 respectively, and two admission chambers 11 and 12 into which the explosive mixture is drawn, and from which it is expelled at proper times into the combustion chambers in the manner of a two-cycle engine. Projecting into each combustion chamber is an igniting device which may be and preferably is an ordinary spark plug 13 having electrodes 14, and electrically operated in the ordinary way by any suitable timer.

Figure 1:
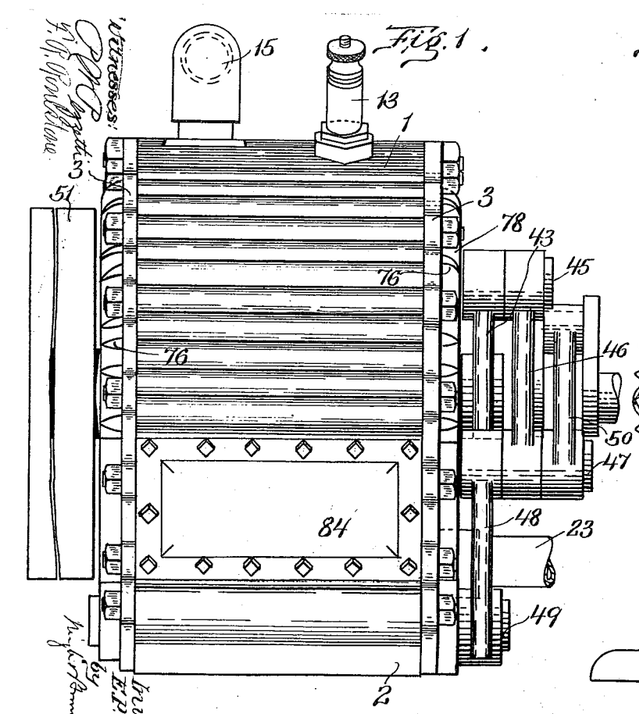
Figure 1 represents a side elevation of the engine.
Figure 2:
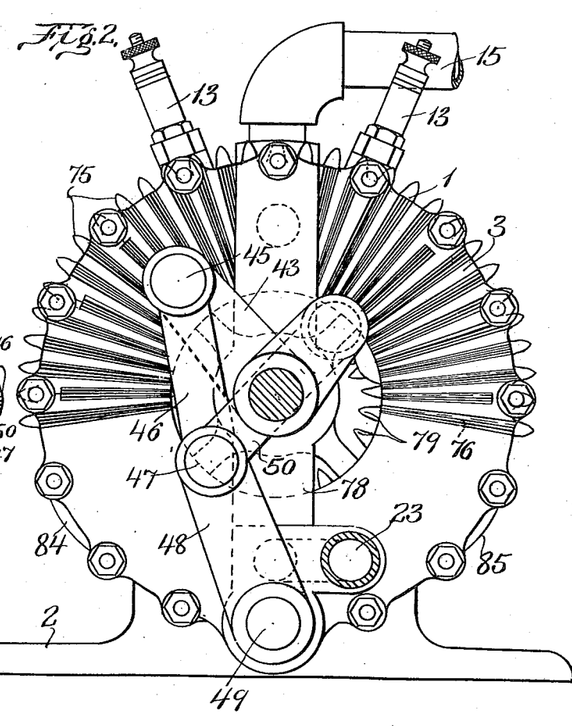
Fig. 2 represents an end elevation as seen from the right-hand side of Fig. 1.
Figures 3, 4, 6, 8:
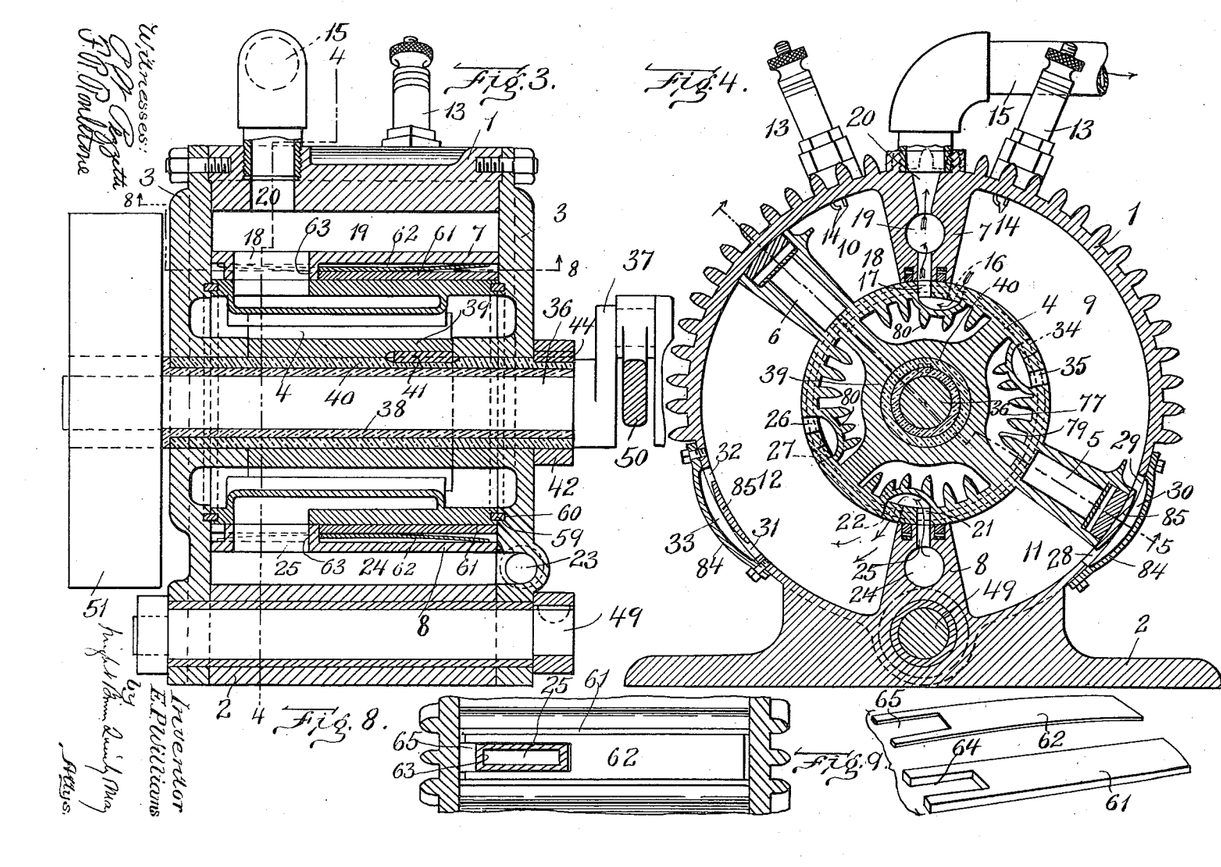
Fig. 3 is a vertical central section of the engine.
Fig. 4 is a cross-section on the line 4—4 of Fig. 3.
Fig. 6 is a sectional view of the engine casing on the same line but showing the oscillating parts in elevation.
Fig. 8 is a detail sectional view on line 8—8 of Fig. 3.
Figure 5:
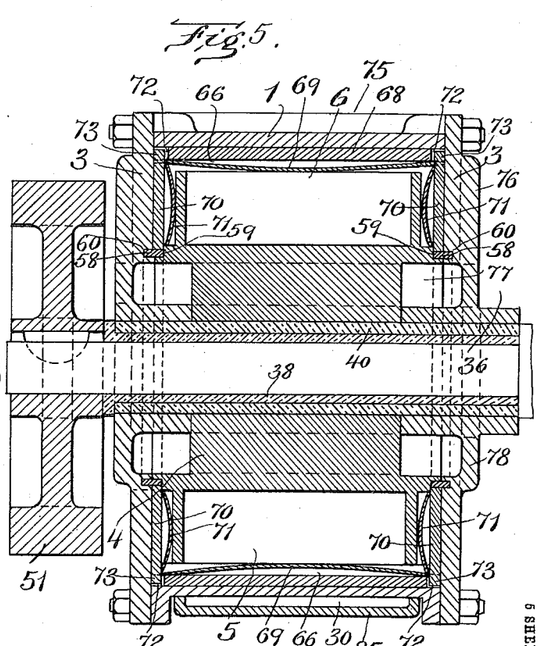
Fig. 5 is a longitudinal sectional view of the engine on line 5—5 of Fig. 4.
Figure 6:
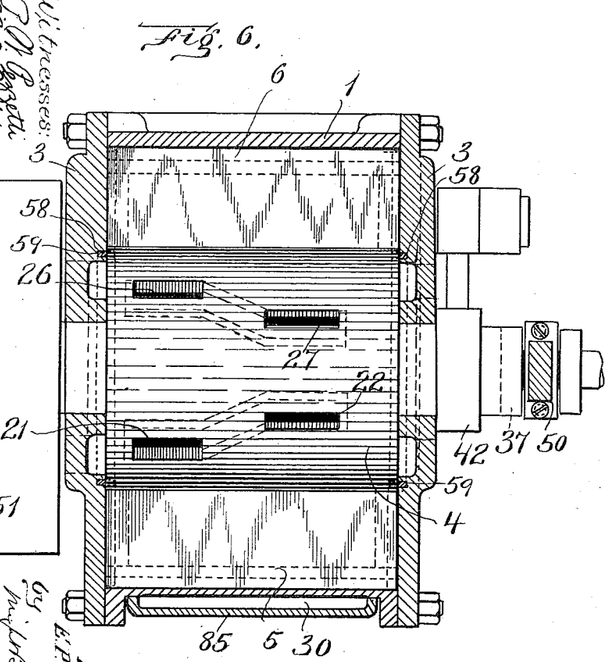
Figures 7, 10, 11:
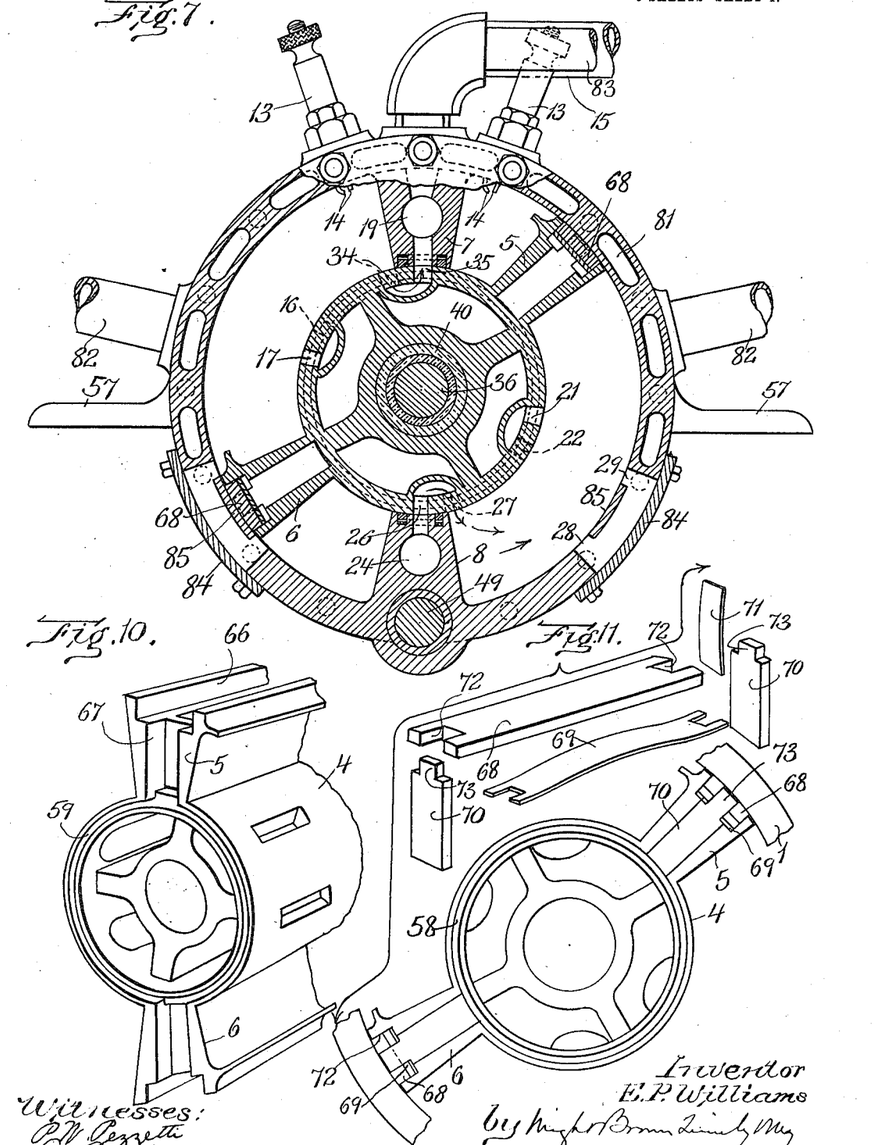
Fig. 7 is a view similar to Fig. 4, but showing the oscillating parts in another position, and showing also some modifications in the details of construction of the engine.
Fig. 10 is a perspective view of one end of the oscillating member of the engine.
Fig. 11 represents the packings for this oscillating member, showing the member in end elevation with the packings applied thereto and showing also in perspective the packings detached therefrom.

As shown in Fig. 4, the piston 6 is in position ready to be driven by an explosion in the chamber 10. When the charge in this chamber is ignited the vibrator is driven until it reaches the position shown in Fig. 7, thus moving the piston 5 toward the abutment 7 and compressing the charge in the combustion chamber 9. Explosion of the charge in this chamber then forces the piston 5 away from this abutment and returns the vibrator to the position shown in Fig. 4. When in this position a passage is opened through the vibrator from the combustion chamber 9 to an exhaust pipe 15. In order to open this passage the vibrator is provided with a pair of connecting ports shown at 16 and 17 respectively, the latter of which uncovers a passage 18 extending inward from the end of the abutment into an exhaust chamber 19 therein. From the exhaust chamber is an outlet passage 20 communicating with the exhaust pipe. When the ports 17 and 18 are thus in registry, the port 16 remains open to the combustion chamber and thus a free passage of the burned gases into the exhaust is permitted. At the same time a pair of similarly arranged and connected ports 21 and 22 in the vibrator open an inlet passage through the abutment 8 to the admission chamber 12, and a mixture of fuel, gas, or vapor and air is allowed to flow from the carbureter into such chamber. The admission pipe is shown in Figs. 1 and 2 at 23 and it opens into a chamber 24 in the abutment 8 similar to the chamber 19 in abutment 7, while a port 25 leads from such chamber to the inner end of the abutment. Likewise the vibrator contains a connected pair of ports 26 and 27, which connect the admission chamber 11 with the carbureter when the piston 5 is in its compressing position, as shown in Fig. 7, thus allowing combustible mixture to pass into this chamber. At the end of its working swing the piston passes between two ports 28 and 29 in the casing wall, which are connected by a passage 30, through which ports and passage the combustible mixture compressed into the admission chamber 11 is allowed to flow into the combustion chamber 9, expelling the remainder of the exhaust gases thereof and supplying a fresh mixture ready to be compressed upon the return stroke of the piston. Similarly in the part of the casing wall traversed by the piston 6 are ports 31 and 32 connected by a passage 33 which permit the fresh charge compressed in the admission chamber 12 by the piston 6 to flow into the combustion chamber 10 when the said piston pauses between the ports 31 and 32 at the end of its working stroke, as shown in Fig. 7. When the vibrator is in the latter position a second set of exhaust ports 34 and 35 establishes communication between the compression chamber 10 and exhaust, allowing the products of combustion in the chamber 10 to be expelled. It will be readily understood that explosions take place alternately in the chambers 9 and 10, thereby rocking the vibrator back and forth, and that while the products of the explosion are expanding and one piston is making its working stroke, the other piston is drawing a fresh charge into its admission chamber, compressing the previously admitted charge into its combustion chamber ready for ignition. At the same time the working piston is compressing an explosive charge in its admission chamber, which charge passes into the combustion chamber when the piston reaches the end of its stroke and takes the place of the exhaust gases escaping through the now open exhaust.

With the arrangement shown it is to be noted that there are practically two engines included within one structure, each of which supplements the other, thus imparting a double action to the vibrator. A secondary piston vibrating between two abutments, or within an annular space interrupted by a single abutment having both admission and exhaust passages, would be feasible, but would be single-acting only and would require other means for returning its vibrator to starting position. Likewise the same vibrator might be provided with more than two pistons and the casing with more than two abutments, in order to enable greater force to be applied, but however great may be the number of pistons, the vibrator can only be single-acting in any case, while with a large number of pistons and abutments, its range of movement is limited. From all considerations I consider the form of engine herein illustrated and described having two pistons and two abutments, to be the most efficient, simple and practical.

I will now describe the means which I employ for converting the oscillating movement of the vibrator into continuous rotation of a driven element. In Figs. 1, 2, 3 and 4 the driven element is a shaft 36 passing concentrically through the casing and vibrator, and having a crank 37 on its end. This shaft has a bearing in a sleeve or bushing 38, which passes through the vibrator and has no connection with the latter, except that of a supporting pivot. Surrounding the sleeve 38 and contained within the hub portion 39 of the vibrator is a sleeve 40 which is so connected to the vibrator as to move with it, the connection being conveniently a key 41. This sleeve passes through the end wall or head 3 of the engine casing and supports on its end a hub 42 of a rocker 43 external to the casing. This hub is secured to the sleeve 40 by a key 44 so that it is oscillated with the oscillations of the vibrator. Connected to a wrist pin 45 on the arm 43 is a link 46 which has a recessed connection upon a stud 47 with a second rocker arm 48 pivotally mounted upon a stud 49 on the engine base. Likewise mounted upon the stud 47 is a connecting rod or pitman 50 which is pivoted to the crank 37. As the rocker 43 is oscillated back and forth in accordance with the movements of the vibrator it causes the knuckle 47 to move back and forth away from and toward the axis of the shaft 36, moving the pitman 50 in the manner of an ordinary connecting rod and thereby driving the shaft rotarily. A heavy fly wheel or balance wheel 51 on the shaft 36 carries the crank past the dead points and causes the direction of rotation of the shaft to remain constant.

Figure 12:
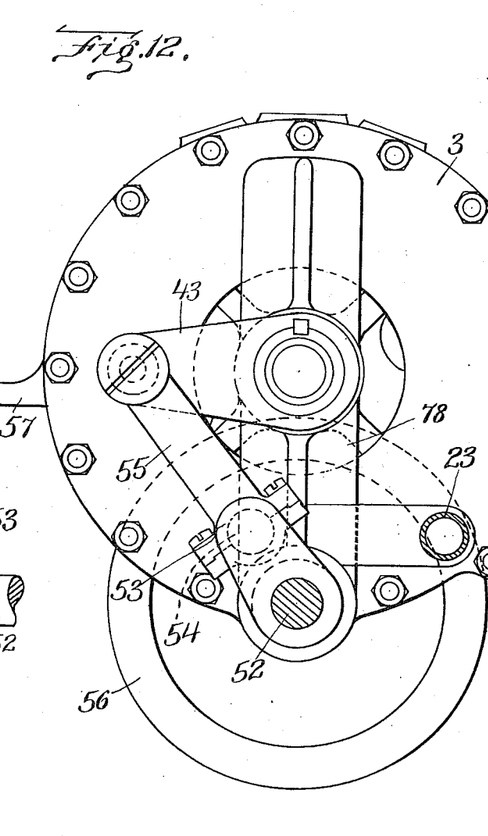
Fig. 12 is an elevation similar to Fig. 2 showing a modification in the engine structure and in the mode for developing continuous rotary movement therefrom.
Figure 13:
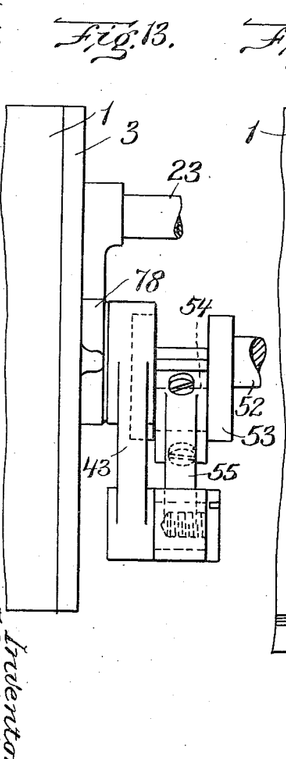
Fig. 13 is a plan view of the motion-transmitting mechanism illustrated in Fig. 12
Figure 14:
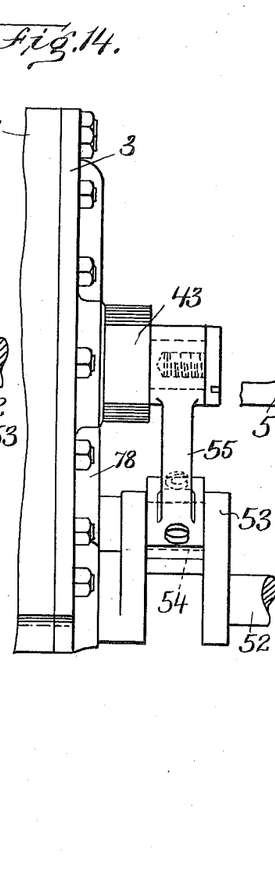
Fig. 14 is a side elevation of the same.

A modification of the driving connections is illustrated in Figs. 12, 13 and 14. In this form of the engine the driven shaft 52 occupies the position of the stud 49 previously described, and carries a crank 53, the pin 54 of which is engaged by a connecting rod 55 pivoted to the rocker 43. As the crank 53 is shorter than the rocker 43 it is completely rotated by the oscillative movements of the latter. The fly wheel 56, which in this embodiment of the invention is secured to the shaft 52, extends beyond the periphery of the engine casing on account of which this modification of the engine is provided with brackets 57 at the opposite sides of the casing by which the entire engine and the fly wheel may be hung.

Packings are provided between all the rubbing surfaces at the points where there is liability to leakage of the working fluid. Thus between the ends of the cylindrical part of the vibrator and the heads of the engine casing are rings 58 of any approved construction set into grooves 59 in the ends of the vibrator and also preferably contained in registering circular grooves 60 in the casing heads. Any packing rings, whether extensible or not, suitable for the purpose, may be employed at these points. Between the abutments 7 and 8 and the periphery of the cylindrical part of the vibrator are packing strips 61. These strips, as shown in Fig. 9, are broad bars or plates set into recesses in the ends of the abutments and pressed outwardly from such recesses against the vibrator by springs 62. In the recesses in the abutments at the points where the ports 18 and 25 respectively pass are nipples or flanges 63 surrounding these ports and projecting as far as the periphery of the vibrator. In order to accommodate these nipples the packing strips and springs are cut out at one end forming the notches 64 and 65. The parts of the packing strip flanking the notch bear on the periphery of the vibrator at each side of the port. The outer faces and ends of the pistons 5 and 6 are likewise recessed, as shown in Fig. 10, each piston having a longitudinal recess or groove 66 in its outer face and a radial recess or groove 67 in each end. In the groove 66 in each piston is a packing strip 68 which is pressed outward against the curved inclosing walls of the casing by a spring 69. In the end groove of the pistons are packing pieces 70 compressed outwardly against the heads of the casing by springs 71. The ends of the packing strip 68 are recessed to provide notches 72 into which tongues 73 on the outer ends of the end packing pieces 70 project, in order that the packing at the corners of the piston may be as nearly leakage-proof as possible.

The engine shown in Figs. 1 to 4 is designed to be air-cooled, and for that purpose its curved sides are provided with pointed heat-radiating ribs 75 and its heads or end walls are formed with similar ribs 76. Provision for cooling the interior of the engine is also made by reason of the skeleton structure of the vibrator shown best in Fig. 4. The cylindrical part of the vibrator is cored out in its interior, leaving spaces 77 passing from end to end, and the heads, as shown in Fig. 2, are annular in form, with a central circular opening for the passage of air. The supports for the shaft 36 and sleeves 38 and 40 are provided in cross beams 78 formed integrally upon the heads and crossing the central openings therein, such beams having sufficient mass to provide the bearings, but not to obstruct the central openings. The latter allow the air to flow through the vibrator, which is provided with radiating points or ribs 79 projecting from the central part into the air passages, while for the purpose of inducing a current of air through these openings, a fly wheel is or may be made with fan-shaped spokes. Communication between the pairs of ports previously described as being formed in the cylindrical part of the vibrator, is made by webs 80 joined to the inner surface of the cylindrical part and embracing the ports of each pair or set. These webs cause the gases which pass into one of the ports to pass out through the other port of the pair, without escaping through into the air spaces in the vibrator.

The form of engine shown in Fig. 7 is designed to be water cooled, and for that purpose the shell is cored, making water-jacketing spaces 81, which are joined together by cross-connecting passages, not shown, and are supplied with water from the pipe 82. The outlet for the water is through a pipe 83.

As a convenient measure of construction, the passages 30 and 33, previously described as being provided for the purpose of permitting the fresh explosive charge to flow into the compression chambers when the pistons are in certain positions, are closed on their outer sides by separate plates 84 bolted on the outside of the engine shell. The ports 28, 29 and likewise the ports 31 and 32 pass entirely through the casting of which the curved walls of the engine are made, and are separated by webs 85 integral with the casting. The plates 84 are set a sufficient distance outside of the webs 85 to give space for free passage of the gases.

In order to guard as effectively as possible against leakage of the gases passed between the abutment and vibrator when the latter is in such position as to bring its ports in registry with the inlet and exhaust, the ports of the vibrator are offset longitudinally from one another, as shown in Fig. 6. The admission and exhaust ports, as shown in Fig. 3, are located near one end of the engine and the ports 21, 26 and 17, 35, which are designed to register respectively with the admission and exhaust, are placed in a corresponding position or zone of the vibrator. The complemental ports on the vibrator which connect the various chambers of the engine with the admission and exhaust, are offset toward the other end of the vibrator, thus interposing longitudinal or axial space as well as annular space between the ports.

An engine constructed in all respects substantially as hereinbefore described, may be driven by steam by simply applying suitably formed rocking admission and release valves in the cored holes 17 and 25 in the abutments. These openings would then constitute valve chests to which steam would be admitted and from which it would be removed by suitable supply and exhaust pipes. The valves would be simple in form, having ports adapted to register with the ports 18 and 25 respectively and with the admission and exhaust conduits respectively at different times. In making the engine over into a steam engine the by-pass ports 28, 29, and 31, 32, would, of course, have to be closed. A duplex double-acting steam engine would thus be formed having steam spaces on each side of each of its pistons. Such an engine might be made compound.

An engine constructed as hereinbefore described, whether to be driven by the internal combustion of a gaseous mixture, or by steam, is flexible in its possibilities of adaptation to various needs, in that it can easily be made to furnish more or less power and to run at different speeds with more or less degree of expansion of the working fluid, without change in its principles of design, and without any great change in its dimensions or cost. The cylindrical casing may very easily be made somewhat larger or smaller in diameter with very little difference in expense, and when made greater in diameter, it enables the working fluid to act at a greater distance from the center of oscillation, and therefore to apply a much greater leverage to the oscillating rocker arm and connections driven thereby. Likewise the working chambers may be generally enlarged either by increasing the outer diameter of the casing, or by increasing the length thereof, or both, without interfering with any of the working parts, and without incurring more than very nominal expense.

I claim,—

1. A semi-rotary internal combustion engine comprising a cylindrical casing having internal abutments, a vibrator arranged centrally within said casing and oscillative about the axis of the latter, a piston carried by said vibrator between, and movable toward and from, said abutments, means for causing a combustible charge to be admitted into the space between said piston and one abutment, provisions for conducting the charge therefrom into the space between said piston and the other abutment consisting of a passage in the casing wall having two openings angularly so spaced as to lie on opposite sides of the piston when the latter is at the end of its working stroke, and means for moving said piston toward said abutment to compress the charge in the last-named space.

2. A semi-rotary internal combustion engine comprising cylindrical inner and outer walls, one of which is stationary and the other vibrates, abutments fixed to the stationary wall in packed contact with the vibrating wall, a piston fixed to the vibrating wall between the abutments in packed contact with the stationary wall, dividing the space between the abutments into a working chamber and an admission chamber, an admission port in one abutment, an exhaust port in the other abutment, passages in the vibrating wall arranged to establish communication between the working chamber and the exhaust port, and between the admission chamber and the admission port, respectively, when the vibrating wall and piston are at respectively opposite limits of their travel, and a by-pass in the stationary wall arranged to establish communication between the two chambers when the piston is at one limit of travel.

3. A duplex internal combustion motor comprising a cylindrical casing, a vibrator arranged centrally within said casing and adapted to rock upon the axis of the latter, said vibrator having a cylindrical central portion, abutments extending across the space between the walls of said casing and the cylindrical portion of said vibrator, pistons carried by said vibrator on each side of each abutment, the pistons and abutment forming two combustion chambers and two admission chambers, means for admitting an explosive mixture periodically into each admission chamber consisting of a passage in one of the abutments opening against such cylindrical portion, and transfer passages in the latter, and means for transferring the mixture therefrom to the respective combustion chambers.

4. A duplex semi-rotary two-cycle internal combustion motor comprising a cylindrical casing, a cylindrical vibrator arranged centrally within said casing and adapted to rock on the axis thereof, abutments within said casing at approximately diametrically opposite points tangent with said vibrator, one of said abutments having a passage for the escape of exhaust gases and the other having a passage for the admission of fresh charges, pistons carried by said vibrator on opposite sides thereof, and with the abutments dividing the interior of the casing into two combustion chambers and two admission chambers, said vibrator and pistons being alternately driven in opposite directions by explosions in the respective combustion chambers, and passages in said vibrator and the casing walls arranged to permit escape of exhaust gases from the combustion chambers, inflow of fresh charges to the admission chambers and travel of the charges from the admission chambers to the combustion chambers at certain points in the travel of the vibrator and its pistons.

5. A double-acting internal combustion engine comprising a single casing, a plurality of rigidly connected vibrating pistons contained in said casing, a plurality of abutments intermediate the pistons providing combustion chambers and an equal number of admission chambers, means for admitting combustible mixture into each admission chamber, and means for permitting transfer of the mixture around the adjacent piston into the next combustion chamber when each piston is at the end of its working stroke, whereby upon the working stroke of each piston the other piston is caused to compress the charge in its chamber.

6. An internal combustion motor comprising a cylindrical casing having internal abutments, a piston arranged to travel with said casing in a rotary path, dividing the space between the abutments into combustion and admission chambers, provisions for admitting an explosive mixture into the admission chamber and a transfer passage in the casing having ports opening into the interior of the casing, controlled by the piston arranged to make communication between the chambers when the piston is at one limit of its travel.

7. A double-acting oscillative engine comprising a circular casing, a vibrator in such casing, inclosing between them segmental spaces, pistons on opposite sides of the vibrator, abutments on opposite sides of the casing between the pistons, said abutments and pistons forming a plurality of admission and combustion chambers, ports in the abutments and passages in the vibrator arranged to permit inflow of the combustible charges alternately into each admission chamber and exhaust of the spent charges simultaneously from the diametrically opposite combustion chamber, and passages for permitting flow of the combustible charges from the admission to the combustion chambers.

8. A semi rotary or oscillative motor comprising a circular casing, a circular vibrator mounted rotatively in said casing, a plurality of abutments in the casing having ports opening at their inner ends, a plurality of pistons carried by said vibrator, said abutments and pistons dividing the interior of the casing into a plurality of working chambers, and the vibrator having passages adapted to establish communication between said ports and the interior of the casing at predetermined times in the oscillations of the vibrator.

9. In an engine of the character described, a casing, a vibrator within said casing having a cylindrical body and passages formed therein with ports in the cylindrical surface of the vibrator, such outlets being separated both angularly and axially of the vibrator, and abutments in the casing making contact with the cylindrical surface, and having passages arranged to register with such ports in certain positions of the vibrator.

10. An engine of the character described, comprising a cylindrical casing, a vibrator having a cylindrical hub mounted co-axially in said casing, two abutments on the casing in close contact with the periphery of the hub and each having a port on the side next to the hub, a piston on the hub between the abutments, and passages in the hub having angularly separated openings at the surface of the latter, arranged to establish communication between the port of each abutment and the space between the abutment and piston when the piston is approximately at its greatest distance from that abutment.

11. The combination with a cylindrical casing, a vibrator therein adapted to be driven oppositely, a shaft concentric with said vibrator, and means for imparting complete and continuous rotation from the vibrator to the shaft comprising a crank secured to the vibrator, a crank secured to the shaft, an independently pivoted rocker, and links passing from each crank to the rocker.

12. A semi-rotary engine including a cylindrical casing, a vibratory piston mounted co-axially in such casing, abutments on the casing flanking said piston, provisions for admitting a combustible mixture to the casing, in a manner such as to cause the piston to be driven back and forth, a shaft co-axial with the casing, and means for imparting continuous rotation to the shaft from the oscillatory movement of the piston, comprising a rocker secured to the piston, a second rocker pivoted eccentrically of the piston and casing, a link connecting said rockers, a crank of less length than the first-named rocker secured upon the shaft, and a link connecting said crank with the second rocker.

In testimony whereof I have affixed my signature, in presence of two witnesses.

EDWARD P. WILLIAMS.

Witnesses:
ARTHUR H. BUNN,
P. W. PEZZETI.